US009605725B2

United States Patent
Seto et al.

(10) Patent No.: US 9,605,725 B2
(45) Date of Patent: Mar. 28, 2017

(54) ROTARY DAMPER

(71) Applicant: NIFCO INC., Yokohama-shi, Kanagawa (JP)

(72) Inventors: Masatora Seto, Yokohama (JP); Young Kook Lee, Cheonan-shi (KR)

(73) Assignees: NIFCO INC., Yokohama-Shi, Kanagawa (JP); NIFCO KOREA INC., Chungcheongnam-Do (KR)

( * ) Notice: Subject to any disclaimer, the term of this patent is extended or adjusted under 35 U.S.C. 154(b) by 0 days.

(21) Appl. No.: 14/382,672

(22) PCT Filed: Feb. 28, 2013

(86) PCT No.: PCT/JP2013/001205
§ 371 (c)(1),
(2) Date: Sep. 3, 2014

(87) PCT Pub. No.: WO2013/132793
PCT Pub. Date: Sep. 12, 2013

(65) Prior Publication Data
US 2015/0034435 A1 Feb. 5, 2015

(30) Foreign Application Priority Data
Mar. 8, 2012 (JP) .................................. 2012-051274

(51) Int. Cl.
F16F 9/12 (2006.01)
F16F 9/36 (2006.01)

(52) U.S. Cl.
CPC ................ *F16F 9/12* (2013.01); *F16F 9/369* (2013.01)

(58) Field of Classification Search
CPC ..................................... F16F 9/12; F16F 9/369
(Continued)

(56) References Cited

U.S. PATENT DOCUMENTS 6,662,683 B1* 12/2003 Takahashi .............. B60N 3/023
188/290
7,032,985 B1* 4/2006 Ichioka ................ A47B 88/047
16/51
(Continued)

FOREIGN PATENT DOCUMENTS

DE          4119090 A1    12/1991
DE      102004025276 A1   12/2005
(Continued)

OTHER PUBLICATIONS

PCT, "International Search Report for PCT/JP2013/001205".
(Continued)

*Primary Examiner* — Vishal Sahni
(74) *Attorney, Agent, or Firm* — Manabu Kanesaka

(57) ABSTRACT

A rotary damper includes a housing having an outer cylinder, an inner cylinder coaxially disposed inside the outer cylinder, and a bottom plate closing one end side of the outer cylinder and the inner cylinder, to form an annular liquid chamber with a viscous fluid therein, and a rotor including a cylindrical blade portion rotatably received in the liquid chamber. An annular locking groove extends circumferentially in a first portion at an outer peripheral surface of the inner cylinder, or a second portion facing the first portion on an inner peripheral surface of the blade portion. A locking convex portion projects from the other of the first portion or the second portion, and locked in the locking groove. An annular inside seal member is interposed between the inner cylinder and the blade portion, and an annular outside seal member is interposed between the outer cylinder and the blade portion.

9 Claims, 5 Drawing Sheets

(58) Field of Classification Search
USPC .................................................. 188/290, 296
See application file for complete search history.

(56) References Cited

U.S. PATENT DOCUMENTS

| | | | | |
|---|---|---|---|---|
| 7,264,096 | B2* | 9/2007 | Hayashi | F16F 9/12 188/290 |
| 2001/0017247 | A1* | 8/2001 | Machida | B60N 3/023 188/290 |
| 2002/0101014 | A1* | 8/2002 | Kurihara | B60N 3/023 267/140.13 |
| 2006/0113154 | A1* | 6/2006 | Hayashi | F16F 9/12 188/290 |
| 2010/0282553 | A1* | 11/2010 | Cultraro | F16F 9/145 188/290 |
| 2012/0273310 | A1* | 11/2012 | Seto | B60N 3/023 188/290 |

FOREIGN PATENT DOCUMENTS

| | | |
|---|---|---|
| JP | 2002-021902 A | 1/2002 |
| JP | 2002-327800 A | 11/2002 |
| JP | 4524771 B2 | 8/2010 |
| WO | 2007/102111 A2 | 9/2007 |

OTHER PUBLICATIONS

China Patent Office, "Office Action for CN201380012525.0," Apr. 27, 2015.
Europe Patent Office, "Search Report for EP 13757948.8," Oct. 30, 2015.

* cited by examiner

ROTARY DAMPER

RELATED APPLICATIONS

The present application is National Phase of International Application No. PCT/JP2013/001205 filed Feb. 28, 2013, and claims priority from Japanese Application No. 2012-051274, filed Mar. 8, 2012.

FIELD OF TECHNOLOGY

The present invention relates to a rotary damper.

BACKGROUND ART

Conventionally, in order to slow a rotational speed of a rotary body such as a door, a lid, a handle (a grip handle), and the like rotatably supported relative to a base, there is used a rotary damper (for example, Patent Documents 1 and 2). The rotary damper includes a housing in which a viscous fluid is enclosed inside thereof, and a rotor including a blade portion rotatably housed inside the housing (for example, the Patent Document 1). The housing is connected to one of either the base or the rotary body, and the rotor is connected to the other of either the base or the rotary body. When the rotary body rotates relative to the base, the rotor rotates relative to the housing, and due to a fluid resistance (an internal frictional resistance) of the viscous fluid, there is generated a braking torque between the rotations of the rotor and the housing so as to slow the rotation of the rotary body relative to the base.

The rotary damper according to the Patent Document 1 comprises the housing including an outer cylinder having a predetermined axis line, an inner cylinder disposed coaxially inside the outer cylinder, and a bottom plate closing one end side in an axis line direction of the outer cylinder and the inner cylinder, wherein an annular liquid chamber is defined by the outer cylinder, the inner cylinder, and the bottom plate; and the rotor including the cylindrical blade portion rotatably received in the liquid chamber coaxially with the outer cylinder. O-rings having flexibility are interposed respectively between a rotor shaft and the outer cylinder, and between the blade portion and the inner cylinder, and the rotor and the housing are rotatably sealed. A control of a movement in a rotational axis line direction of the rotor relative to the housing, i.e., a prevention of the rotor from coming out of the housing, is carried out by locking one of either the rotor or the housing in a locking portion formed in the other of either the rotor or the housing.

PRIOR ART DOCUMENTS

Patent Documents

Patent Document 1: Japanese Patent No. 4524771
Patent Document 2: International Publication No. 2007/102111

SUMMARY OF THE INVENTION

Problems to be Solved by the Invention

In the aforementioned rotary damper, since the rotary damper may be disposed in a small space (for example, it is incorporated in the handle of a carrier bag) it is required to be made compact. However, the braking torque of the rotary damper is correlated to a contact area between the rotor and the viscous fluid, so that if an external shape of the rotary damper is reduced, the rotor also becomes smaller so as to have a possibility of reduction in the braking torque. Consequently, it is difficult to reduce the external shape of the rotary damper, i.e., make a more compact size while maintaining the braking torque.

In one embodiment of the rotary damper according to the Patent Document 1, the rotor includes an insertion cylinder portion passing through an inner peripheral surface side of the inner cylinder of the housing, and has a structure of being engaged with an end edge of the inner cylinder in which the insertion cylinder portion is passed through. In that structure, by providing the insertion cylinder portion, the rotary damper increases in a radial direction, and after the insertion cylinder portion passes through the inner cylinder, the insertion cylinder portion is engaged with the end edge of the inner cylinder so as to have a problem of increasing the rotary damper even in the axis line direction. Also, one embodiment of the rotary damper according to the Patent Document 1 and one embodiment of the rotary damper according to the Patent Document 2 have a structure provided with a locking piece engaging with an end portion of the rotor in the outer cylinder. In that structure, since the locking piece is provided, for the portion of the locking piece, a contact area between an outer peripheral surface of a rotor blade and the viscous fluid has to be reduced to thereby have a problem that the braking torque becomes smaller. Also, one embodiment of the rotary damper according to the Patent Document 1 has a structure wherein a flange portion extending on an outer peripheral surface side of the outer cylinder of the rotor is provided, and an end of the flange portion is locked in an annular groove formed on an outer peripheral surface of the outer cylinder. However, in that structure, the flange portion expands the rotary damper in the radial direction so as to be unable to be made compact. As explained above, in the conventional rotary damper, a locking structure for controlling the movement in the axis line direction of the rotor relative to the housing is not sufficient for obtaining both a high braking torque and a more compact size.

The present invention is made in view of the aforementioned backgrounds, and has an object of obtaining both a high braking torque and a more compact size in the rotary damper.

Means for Solving the Problems

In order to obtain the aforementioned object, the present invention is a rotary damper (1) comprising a housing (2) including an outer cylinder (6) having a predetermined axis line (A), an inner cylinder (7) coaxially disposed inside the outer cylinder, and a bottom plate (8) closing one end side in an axis line direction of the outer cylinder and the inner cylinder, in which an annular liquid chamber (9) is defined by the outer cylinder, the inner cylinder, and the bottom plate, and a viscous fluid is filled in the liquid chamber; a rotor (3) including a cylindrical blade portion (21) rotatably received in the liquid chamber coaxially with the outer cylinder; an annular locking groove (16) extending in a circumferential direction in one of either a first portion (17) which is an outer peripheral surface of the inner cylinder, and is disposed at an end edge portion on a side opposed to the bottom plate side, or a second portion (33) facing the first portion of an inner peripheral surface of the blade portion; a locking convex portion (32) projecting from the other of either the first portion or the second portion, and locked in the locking groove so as to control a relative movement in the axis line direction between the housing and the rotor; an annular inside seal member (38) interposed between a portion on the outer peripheral surface of the inner cylinder and on the bottom plate side more than the first portion and the inner peripheral surface of the blade portion; and an annular outside seal member (37) interposed between a vicinity of the other end in the axis line direction on an inner peripheral surface of the outer cylinder and an outer peripheral surface of the blade portion.

According to the structure, the locking groove and the locking convex portion are provided at portions where the blade portion and the inner cylinder face each other, and on the other end in the axis line direction so as to increase a braking torque by maximizing an area where the blade portion contacts with the viscous fluid while making the rotary damper compact. In a case wherein the rotary damper is made compact by reducing an effect on an external shape of the rotary damper by an arrangement of the locking groove and the locking convex portion, it is considered to dispose the locking groove and the locking convex portion at portions where the inner peripheral surface of the blade portion and the outer peripheral surface of the inner cylinder face each other, or at portions where an outer peripheral portion of the blade portion and the inner peripheral surface of the outer cylinder face each other. However, in the blade portion, a surface area of the outer peripheral surface is larger than that of the inner peripheral surface, so that providing the locking groove or the locking convex portion on the inner peripheral surface of the blade portion can ensure a large contact area between the blade portion and the viscous fluid. Also, when the rotor rotates at a predetermined angle, a moving distance increases on the outer peripheral surface more than that on the inner peripheral surface, so that a contact portion between the outer peripheral surface and the viscous fluid can generate a large braking torque per unit area more than that in a contact portion between the inner peripheral surface and the viscous fluid. Consequently, the locking groove or the locking convex portion is provided on the inner peripheral surface of the blade portion so as to increase the braking torque that the rotary damper generates. From the above, by providing the locking groove or the locking convex portion on the inner peripheral surface of the blade portion, both a more compact size and a high braking torque in the rotary damper can be obtained. By disposing the locking groove or the locking convex portion at the end edge portion on the side opposed to the bottom plate side of the blade portion, a wide contact area between the inner peripheral surface of the blade portion and the viscous fluid can be ensured.

Another aspect of the present invention is that at an end portion in the axis line direction on the outer peripheral surface of the blade portion, there is formed an annular outside-seal-member receiving groove (27) extending in the circumferential direction to receive the outside seal member.

According to the structure, the outside-seal-member receiving groove is provided in the blade portion not in the outer cylinder so as to reduce a thickness of the outer cylinder and make a more compact size in the rotary damper.

Effect of the Invention

According to the aforementioned structures, in the rotary damper, both the high braking torque and the more compact size can be obtained.

BEST MODES OF CARRYING OUT THE INVENTION

Hereinafter, with reference to the drawings, an embodiment according to the present invention will be explained. A rotary damper 1 according to the embodiment is interposed between a side wall of a carrier bag and a handle (a grip handle), and provides a braking torque (a rotational resistance force) relative to a rotation of the handle with respect to the side wall as well as rotatably supports the handle relative to the side wall. Hereinafter, for convenience of explanation, as shown in FIG. 1, a direction where an axis line A of the rotary damper 1 extends will be explained as an up-and-down direction.

Figure 1:
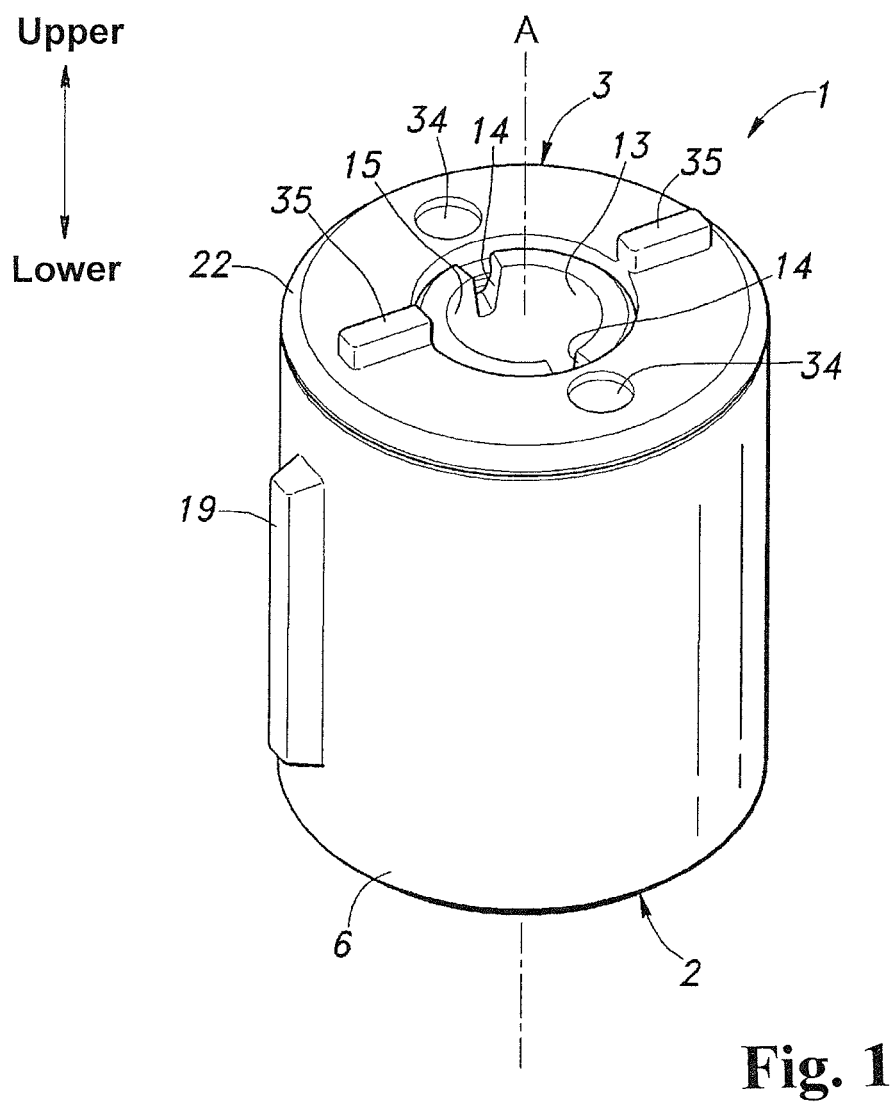
FIG. 1 is a perspective view of a rotary damper according to an embodiment.
Figure 2:
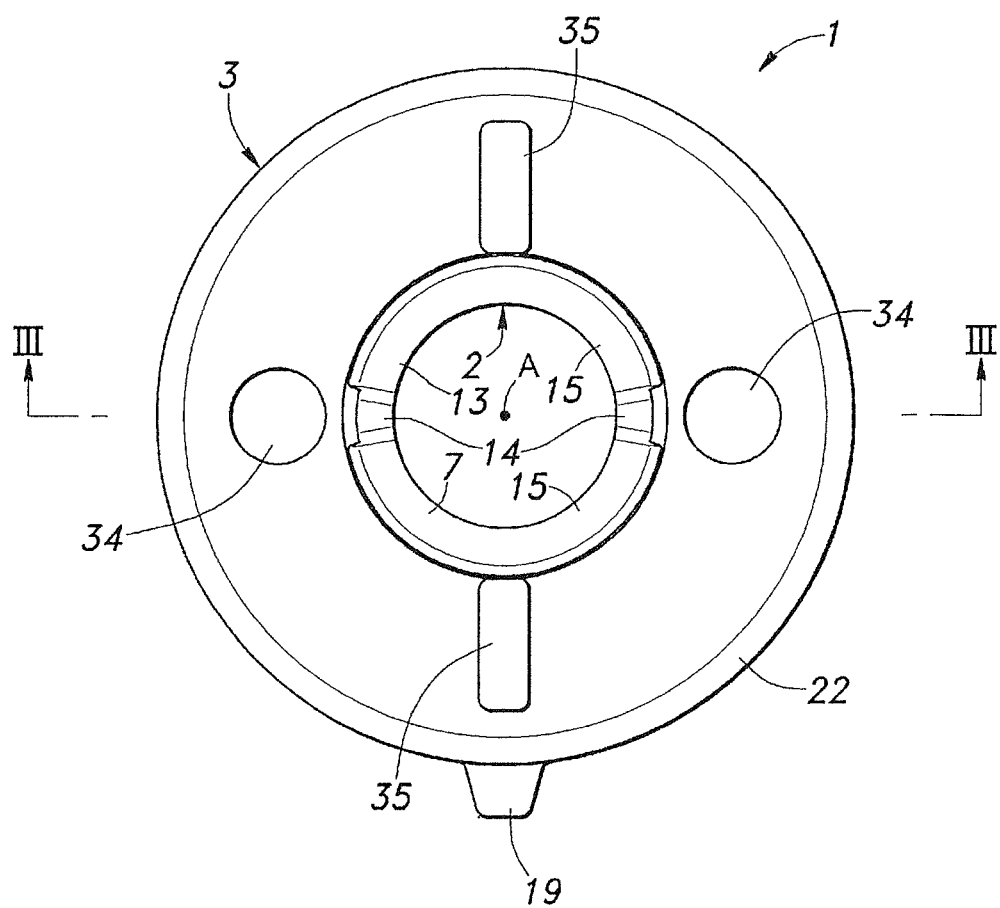
FIG. 2 is a plan view of the rotary damper according to the embodiment.
Figure 3:
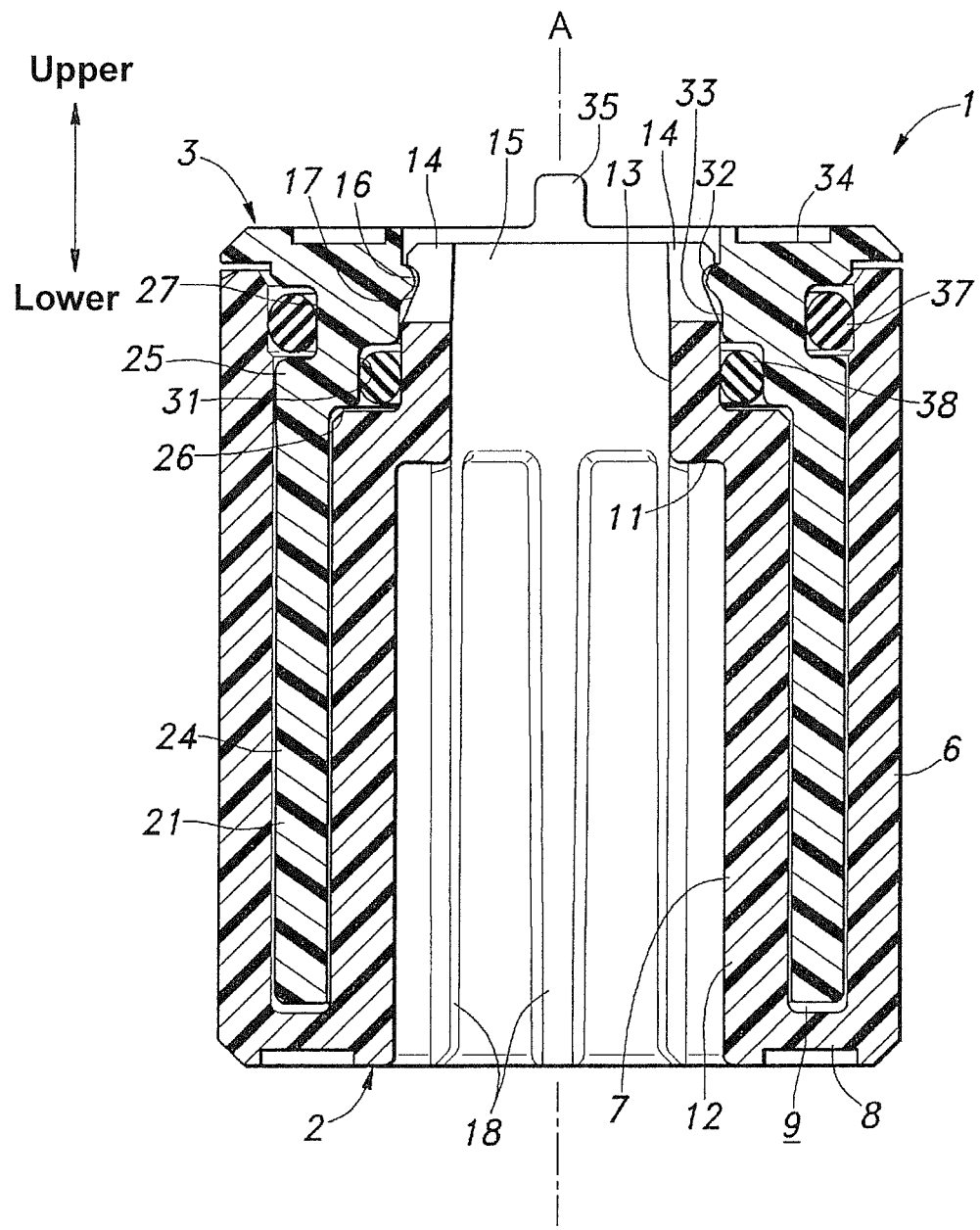
FIG. 3 is a cross-sectional view taken along a line III-III in FIG. 2.

As shown in FIG. 1 to FIG. 3, the rotary damper 1 includes a housing 2 and a rotor 3 as main structure elements. The housing 2 and the rotor 3 may be resin molded articles, and are formed by injection molding of thermoplastic resin such as, for example, polyacetal (POM).

Figure 4:
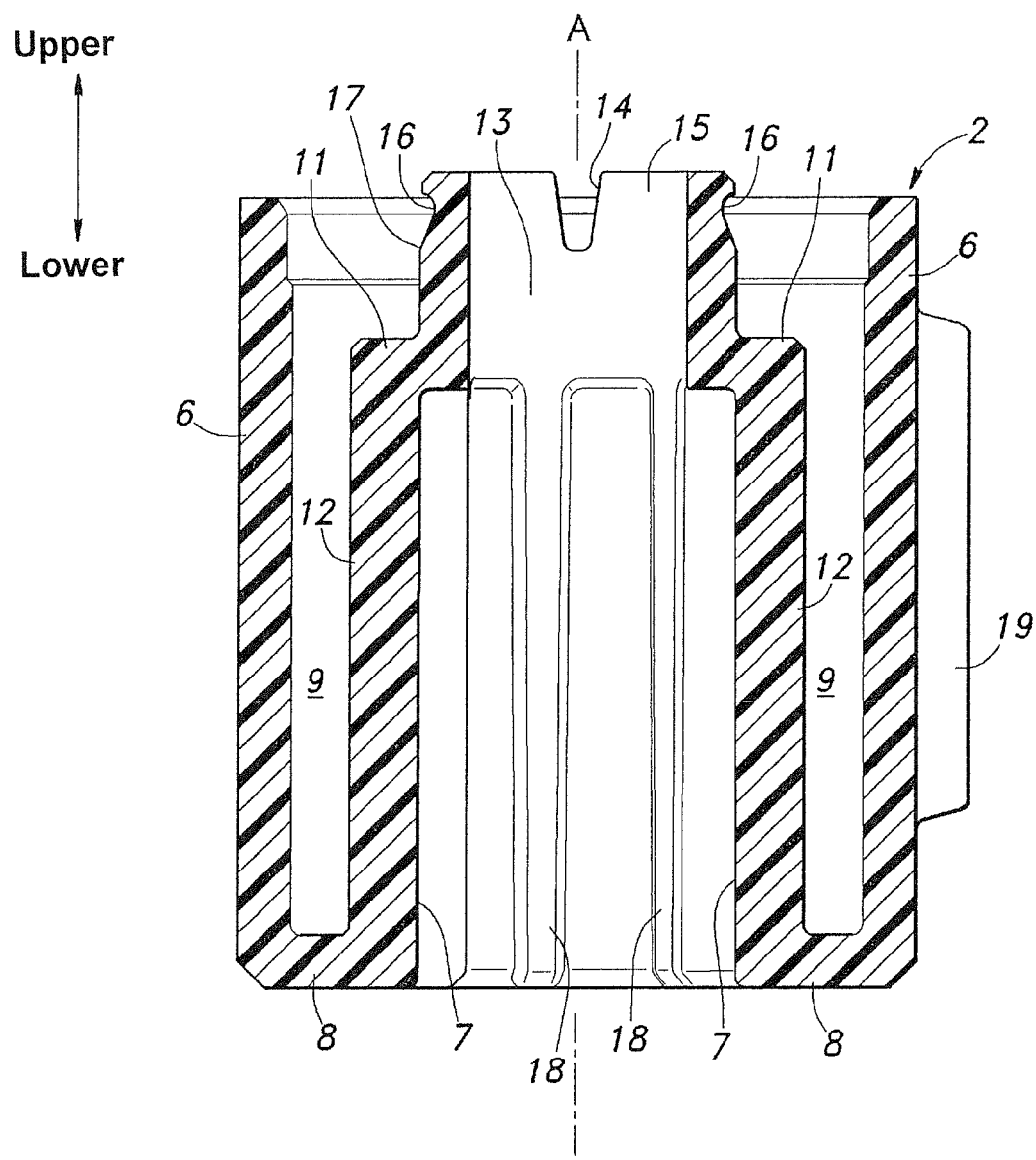
FIG. 4 is a cross-sectional view of a housing according to the embodiment.

As shown in FIG. 3 and FIG. 4, the housing 2 includes a cylindrical outer cylinder 6 as an axis of the axis line A; a cylindrical inner cylinder 7 coaxially disposed inside the outer cylinder 6; and an annular bottom plate 8 disposed at lower ends of the outer cylinder 6 and the inner cylinder 7, and closing between lower edges of the outer cylinder 6 and the inner cylinder 7. The outer cylinder 6 and the inner cylinder 7 concentrically disposed as an axis line of the axis line A, and the bottom plate 8 sealing one end of the outer cylinder 6 and the inner cylinder 7 define an annular liquid chamber 9 opening upward. On an inner peripheral side of the inner cylinder 7, both upper and lower ends are open.

The inner cylinder 7 includes a large diameter portion 12 and a small diameter portion 13 coaxially disposed through a step portion 11, and having a cylindrical shape. The large diameter portion 12 extends upward as the axis line of the axis line A from an inner peripheral edge of the bottom plate 8. The step portion 11 is formed in an annular flat plate extending on a surface orthogonal to the axis line A, and an outer peripheral edge is continuous to an upper end edge of the large diameter portion 12. The small diameter portion 13 extends upward as the axis line of the axis line A from an inner peripheral edge of the step portion 11.

As shown in FIG. 2 to FIG. 4, in the small diameter portion 13, there is formed a pair of slits 14 extending downward from an upper end edge thereof. The slits 14 are formed at symmetric positions around the axis line A, and extend up to an intermediate portion in the up-and-down direction of the small diameter portion 13. By forming the pair of slits 14, an upper half portion 15 of the small diameter portion 13 is divided into two arc-like pieces, and can tilt slightly inward in a radial direction. On an outer peripheral surface (a first portion) 17 of the upper half portion 15 of the small diameter portion 13, there is formed a locking groove 16 extending in a circumferential direction. The locking groove 16 is continuous in the circumferential direction through the pair of slits 14, and has an annular shape.

On an inner peripheral surface of the large diameter portion 12, there is projected a plurality of convex pieces 18 extending in an axis line A direction. The convex pieces 18 are disposed at equal intervals in the circumferential direction, and projecting ends thereof project up to an inner peripheral surface of the small diameter portion 13 in the radial direction. On an outer peripheral surface of the outer cylinder 6, there is projected a convex portion 19 extending in the axis line A direction.

Figure 5:
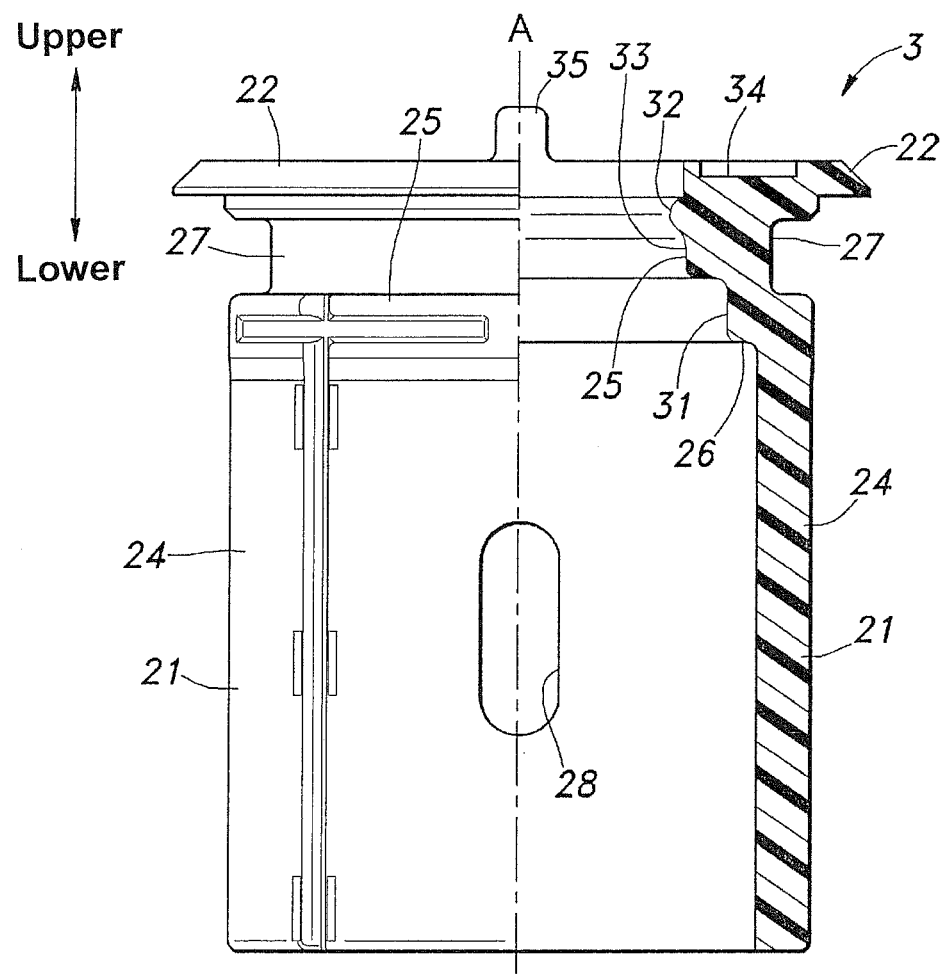
FIG. 5 is a side view and a cross-sectional view of a rotor according to the embodiment.

As shown in FIG. 3 and FIG. 5, the rotor 3 includes a cylindrical blade portion 21 as the axis line of the axis line A, and an annular flange 22 projecting outward in the radial direction from an upper end edge of the blade portion 21. The blade portion 21 includes a cylindrical main body portion 24 opening both ends and forming a large portion of the blade portion 21, and a thick portion 25 continuous to an upper end of the main body portion 24 and having a thickness in a radial direction thicker than that of the main body portion 24. The main body portion 24 and the thick portion 25 have an equal outer diameter, and an outer peripheral surface of the blade portion 21 forms one circumferential surface. An inner diameter of the thick portion 25 is formed smaller than an inner diameter of the main body portion 24, and at a boundary of inner peripheral surfaces of the main body portion 24 and the thick portion 25, there is formed a step portion 26 facing downward. Specifically, it can be said that the main body portion 24 enlarges a diameter of an inner peripheral portion relative to the thick portion 25, and enlarges an area of the inner peripheral surface. The flange 22 may be omitted in other embodiments.

The flange 22 extends along an upper end edge on an outer peripheral surface of the thick portion 25. On the outer peripheral surface of the thick portion 25 and in a vicinity of the upper end edge, there is formed an annular O-ring groove (an outside-seal-member receiving groove) 27 extending in the circumferential direction. It is preferable that the O-ring groove 27 is located closer to the upper end edge. Specifically, it is preferable that the outer peripheral surface of the blade portion 21 formed below the O-ring groove 27 becomes longer in the axis line A direction, and a surface area of the outer peripheral surface becomes larger. At a proper portion of the main body portion 24 of the blade portion 21, there is formed a through hole 28 passing through the blade portion 21 in the radial direction (see FIG. 5).

At a boundary portion between the inner peripheral surface of the thick portion 25 and the step portion 26, there is formed an O-ring housing portion 31 expanded with a different level. The O-ring housing portion 31 expands a diameter around the axis line A, and a bottom face thereof forms a circumferential surface having a diameter same as that of the inner peripheral surface of the main body portion 24. On the inner peripheral surface of the thick portion 25, and in a portion (a second portion) 33 located above the O-ring housing portion 31, there is provided a locking convex portion 32 projecting inward in the radial direction and extending along the circumferential direction in an annular shape. Incidentally, the locking convex portion 32 may continuously extend in the circumferential direction.

On an upper end face of the thick portion 25, there is formed a pair of bottomed fitting holes 34 at symmetric positions around the axis line A. Also, on the upper end face of the thick portion 25, there is formed a pair of connection pieces 35 projecting upward and extending in the radial direction at symmetric positions around the axis line A.

As shown in FIG. 3, in a state wherein the blade portion 21 is received in the liquid chamber 9, the rotor 3 is disposed in the housing 2. The main body portion 24 of the blade portion 21 is disposed between the large diameter portion 12 and the outer cylinder 6, and the thick portion 25 is disposed between the small diameter portion 13 and the outer cylinder 6. The locking convex portion 32 of the thick portion 25 is locked in the locking groove 16 of the small diameter portion 13 rotatably around the axis line A so as to control a relative movement in the axis line A direction between the rotor 3 and the housing 2. A surface of the flange 22 facing downward faces an upper end face of the outer cylinder 6 through a gap. Incidentally, in the other embodiments, the surface of the flange 22 facing downward may slidingly contact with the upper end face of the outer cylinder 6.

In the O-ring groove 27, there is disposed an outside O-ring (an outside seal member) 37, and in the O-ring housing portion 31, there is disposed an inside O-ring (an inside seal member) 38. The outside and inside O-rings 37 and 38 are formed by rubber having flexibility, and are formed by, for example, EPDM. The outside O-ring 37 contacts with a bottom face of the O-ring groove 27 and a bottom face of the outer cylinder 6 so as to seal therebetween. The inside O-ring 38 contacts with an inner peripheral surface of the O-ring housing portion 31 and an outer peripheral surface of the small diameter portion 13 of the inner cylinder 7 so as to seal therebetween. The housing 2 and the rotor 3 slidingly contact with the outside O-ring 37 and the inside O-ring 38 so as to relatively rotate mutually around the axis line A. In the liquid chamber 9 sealed by the outside O-ring 37 and the inside O-ring 38, there is filled a viscous fluid such as, for example, silicone oil, grease, and the like.

In the present embodiment, as shown in FIG. 3, in the axis line A direction, the outside O-ring 37 is disposed between the locking convex portion 32 and the inside O-ring 38. In the other embodiments, in the axis line A direction, positions of the outside O-ring 37 and the locking convex portion 32 may be located at the same position. It is preferable that the outside O-ring 37 and the inside O-ring 38 are disposed on a more upper end side in the axis line A direction. For example, the outside O-ring 37 may be disposed in such a way as to contact with an upper end edge of an inner peripheral surface of the outer cylinder 6. By disposing the outside and inside O-rings 37 and 38 on the upper end side in the aforementioned manner, a contact area between the blade portion 21 and the viscous fluid can enlarge in the axis line A direction.

In the rotary damper 1 formed in the aforementioned manner, for example, the housing 2 is connected to a support piece (not shown in the figures) connected to the side wall of the carrier bag, and the rotor 3 is connected to the handle. In the housing 2, an axis portion of the support piece is inserted into the large diameter portion 12 of the inner cylinder 7 from below and is caught on the convex piece 18 around the axis line A, or the support piece receives the outer cylinder 6 and is caught on the convex portion 19 around the axis line A, so that the housing 2 is connected to the support piece relatively unrotatably around the axis line A. In the rotor 3, the fitting hole 34 thereof and the connection piece 35 are caught on the handle, so that the rotor 3 is connected to the handle relatively unrotatably around the axis line A. Thereby, when the handle rotates relative to the side wall, the rotor 3 rotates relative to the housing 2, and by the viscous fluid enclosed inside the liquid chamber 9, a braking torque is generated relative to a rotation of the rotor 3 relative to the housing 2.

In the present embodiment, in a portion where the blade portion 21 and the inner cylinder 7 face, and in an upper end in the axis line A direction, there are provided the locking groove 16 and the locking convex portion 32, so that while making the rotary damper 1 compact, the contact area between the blade portion 21 and the viscous fluid is maximized so as to increase the braking torque. In a portion where an inner peripheral surface of the blade portion 21 and an outer peripheral surface of the inner cylinder 7 face, or in a portion where an outer peripheral portion of the blade portion 21 and the inner peripheral surface of the outer cylinder 6 face, there are disposed the locking groove 16 and the locking convex portion 32, so that an effect on an external shape of the rotary damper 1 by the locking groove 16 and the locking convex portion 32 can be reduced. Consequently, the rotary damper 1 can be made compact.

The locking groove 16 and the locking convex portion 32 are provided on the inner cylinder 7 and the inner peripheral surface of the blade portion 21 so as to enlarge a contact area between the outer peripheral surface of the blade portion 21 and the viscous fluid. The outer peripheral surface of the blade portion 21 is longer in the circumferential direction compared to the inner peripheral surface, so that providing the locking convex portion 32 on the inner peripheral surface rather than on the outer peripheral surface of the blade portion 21 reduces the sizes of the locking convex portion 32 and the locking groove 16 so as to increase the contact area between the blade portion 21 and the viscous fluid. Also, when the rotor 3 rotates at a predetermined angle, the outer peripheral surface has a moving distance larger than that on the inner peripheral surface, so that a contact portion between the outer peripheral surface and the viscous fluid can generate a braking force per unit area larger than that in a contact portion between the inner peripheral surface and the viscous fluid. Consequently, the locking groove 16 or the locking convex portion 32 is provided on the inner peripheral surface of the blade portion 21, and a large contact range between the outer peripheral surface and the viscous fluid is ensured so as to enlarge the braking torque that the rotary damper 1 generates. Also, the locking groove 16 or the locking convex portion 32 is disposed at the upper end in the axis line A direction on the inner peripheral surface of the blade portion 21 so as to ensure a wide contact area between the inner peripheral surface of the blade portion 21 and the viscous fluid.

In the present embodiment, the inner peripheral portion of the main body portion 24 of the blade portion 21 has the diameter in the radial direction larger than that of the thick portion 25 so as to enlarge a surface area of the inner peripheral surface. On the other hand, the thick portion 25 forms the O-ring groove 27 and the O-ring housing portion 31 so as to ensure a predetermined thickness. The inner diameter of the main body portion 24 becomes larger than the inner diameter of the thick portion 25, so that the area of the inner peripheral surface of the main body portion 24 increases, and a moving amount of the inner peripheral surface of the main body portion 24 per unit rotation angle of the rotor 3 increases so as to increase the braking torque. In order to enlarge the inner peripheral surface of the main body portion 24, it is preferable that a length of the thick portion 25 in the axis line A direction is smaller.

A specific embodiment has been explained hereinabove; however, the present invention is not limited to the aforementioned embodiment, and can be widely modified. Connection methods between the housing 2 and the rotor 3, and a base to buffer the rotation and a rotation body are not limited to a structure shown in the present embodiment, and well-known various structures can be applied.

EXPLANATION OF SYMBOLS

1 . . . a rotary damper, 2 . . . a housing, 3 . . . a rotor, 6 . . . an outer cylinder, 7 . . . an inner cylinder, 8 . . . a bottom plate, 9 . . . a liquid chamber, 12 . . . a large diameter portion, 13 . . . a small diameter portion, 16 . . . a locking groove, 17 . . . an outer peripheral surface (a first portion), 21 . . . a blade portion, 24 . . . a main body portion, 25 . . . a thick portion, 27 . . . an O-ring groove (an outside-seal-member receiving groove), 28 . . . a through hole, 31 . . . an O-ring housing portion, 32 . . . a locking convex portion, 33 . . . a portion (a second portion), 37 . . . an outside O-ring (an outside seal member), 38 . . . an inside O-ring (an inside seal member), A . . . an axis line

What is claimed is:

1. A rotary damper, comprising:
    a housing including an outer cylinder having a predetermined axis line, an inner cylinder coaxially disposed inside the outer cylinder, and a bottom plate closing one end of the housing in an axis line direction between the outer cylinder and the inner cylinder, wherein an annular liquid chamber is defined by the outer cylinder, the inner cylinder, and the bottom plate, and a viscous fluid is filled in the liquid chamber;
    a rotor including a cylindrical blade portion rotatably received in the liquid chamber coaxially with the outer cylinder, and a flange extending radially outwardly from an upper end of the blade portion, and arranged outside of the housing and above an upper surface of the outer cylinder;
    an annular locking groove extending in a circumferential direction in one of either a first portion which is an outer peripheral surface of the inner cylinder and is located at an end edge portion on a side opposite to a bottom plate side, or a second portion facing the first portion on an inner peripheral surface of the blade portion;
    a locking convex portion projecting from the other of either the first portion or the second portion, and locked in the locking groove so as to control a relative movement in the axis line direction between the housing and the rotor;
    an annular inside seal member interposed between a portion on the outer peripheral surface of the inner cylinder and on the bottom plate side more than the first portion, and the inner peripheral surface of the blade portion; and
    an annular outside seal member interposed between a vicinity of the other end of the housing in the axis line direction on an inner peripheral surface of the outer cylinder, and an outer peripheral surface of the blade portion,
    wherein the inner cylinder includes a slit extending between the end edge portion and a portion above the inside seal member through the annular locking groove or the convex portion so that a part of the inner cylinder elastically deforms radially inwardly to receive and hold the rotor, and
    the end edge portion of the inner cylinder is positioned inward of an upper surface of the flange so that the slit of the inner cylinder is positioned inward of the flange.

2. A rotary damper according to claim 1, wherein an annular outside-seal-member receiving groove extending in the circumferential direction to receive the outside seal member is formed at an end portion in the axis line direction on the outer peripheral surface of the blade portion.

3. A rotary damper according to claim 1, wherein the inner cylinder further comprises another slit extending between the end edge portion and the portion above the inside seal member through the annular locking groove or the convex portion, and the slit and said another slit are disposed at a symmetrical position with respect to the axis line to form the end edge portion of the inner cylinder with two arc-shaped halves.

4. A rotary damper according to claim 3, wherein the annular inside seal member is arranged toward the bottom plate relative to the annular outside seal member in the axis line direction and toward the inner cylinder relative to the annular outside seal member in a radial direction of the housing.

5. A rotary damper according to claim 4, wherein the flange of the rotor has an outer peripheral surface aligned to that of the outer cylinder immediately above the upper surface of the outer cylinder.

6. A rotary damper, comprising:
   a housing including an outer cylinder having a predetermined axis line, an inner cylinder coaxially disposed inside the outer cylinder, and a bottom plate closing one end of the housing in an axis line direction between the outer cylinder and the inner cylinder, wherein an annular liquid chamber is defined by the outer cylinder, the inner cylinder, and the bottom plate, and a viscous fluid is filled in the liquid chamber;
   a rotor including a cylindrical blade portion rotatably received in the liquid chamber coaxially with the outer cylinder;
   an annular locking groove extending in a circumferential direction in one of either a first portion which is an outer peripheral surface of the inner cylinder and is located at an end edge portion on a side opposite to a bottom plate side, or a second portion facing the first portion on an inner peripheral surface of the blade portion;
   a locking convex portion projecting from the other of either the first portion or the second portion, and locked in the locking groove so as to control a relative movement in the axis line direction between the housing and the rotor;
   an annular inside seal member interposed between a portion on the outer peripheral surface of the inner cylinder and on the bottom plate side more than the first portion, and the inner peripheral surface of the blade portion;
   an annular outside seal member interposed between a vicinity of the other end of the housing in the axis line direction on an inner peripheral surface of the outer cylinder, and an outer peripheral surface of the blade portion;
   a seal member housing portion receiving the annular inside seal member; and
   an annular seal member groove receiving the annular outside seal member,
   wherein the annular outside seal member is disposed at a position adjacent to the edge portion of the outer cylinder, and the annular inside seal member is arranged at a position deviating from the annular outside seal member to the bottom plate in the axis line direction,
   the blade portion of the rotor includes
      a main body portion for generating a braking torque relative to a rotation of the rotor, and
      a thick portion extending upwardly from an upper end of the main body portion and having an outer diameter equal to that of the main body portion and an inner diameter less than that of the main body portion so that a thickness of the thick portion is greater than that of the main body portion in a radial direction of the housing,
   the seal member housing portion is formed between an inner peripheral surface of the thick portion and the inner cylinder in the radial direction, and
   the annular seal member groove is formed above the seal member housing portion in the axial line direction and between the inner peripheral surface of the outer cylinder and an outer peripheral surface of the thick portion adjacent to the second portion in the radial direction.

7. A rotary damper according to claim 6, wherein the first and second portions are arranged at a side away from the bottom plate relative to the annular outside seal member.

8. A rotary damper according to claim 7, wherein a length of the outer peripheral surface of the blade portion between one end of the blade portion and the seal member groove is greater than a length of the inner peripheral surface of the blade portion between the one end of the blade portion and the seal member housing portion.

9. A rotary damper according to claim 8, wherein the inner cylinder includes
   a large diameter portion extending from the bottom plate in the axis line direction,
   a small diameter portion disposed above the large diameter portion coaxially therewith and having a diameter smaller than that of the large diameter portion, and
   a step portion having an annular flat plate shape extending radially to connect the large diameter portion and the small diameter portion, and
   the annular inside seal member contacts the inner peripheral surface of the thick portion and an outer peripheral surface of the small diameter portion to seal the viscous fluid.

* * * * *